United States Patent
Stafford

(10) Patent No.: US 8,064,499 B2
(45) Date of Patent: Nov. 22, 2011

(54) SPREAD-SPECTRUM PHASE AND CHANNEL TRACKING

(75) Inventor: James F. Stafford, Ashburn, VA (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 945 days.

(21) Appl. No.: 11/937,826

(22) Filed: Nov. 9, 2007

(65) Prior Publication Data

US 2008/0117955 A1     May 22, 2008

Related U.S. Application Data

(60) Provisional application No. 60/859,834, filed on Nov. 17, 2006.

(51) Int. Cl.
*H04B 1/707* (2011.01)
(52) U.S. Cl. .................................. 375/149; 375/E1.016
(58) Field of Classification Search ................ 375/149, 375/E1.016
See application file for complete search history.

(56) References Cited

U.S. PATENT DOCUMENTS

| | | | |
|---|---|---|---|
| 6,088,413 A * | 7/2000 | Autry et al. | 375/372 |
| 6,317,019 B1 | 11/2001 | Fleeter | |
| 6,396,819 B1 | 5/2002 | Fleeter et al. | |
| 6,985,512 B1 | 1/2006 | McDermott et al. | |
| 7,110,435 B1 * | 9/2006 | Sorrells et al. | 375/147 |
| 7,227,884 B2 | 6/2007 | McDermott | |
| 2002/0191632 A1 * | 12/2002 | McDermott | 370/441 |

OTHER PUBLICATIONS

U.S. Appl. No. 11/681,759, filed Mar. 3, 2007, Stafford et al.

* cited by examiner

*Primary Examiner* — Shuwang Liu
*Assistant Examiner* — Michael Neff
(74) *Attorney, Agent, or Firm* — Morgan, Lewis & Bockius LLP

(57) ABSTRACT

Common components are used to detect messages from a variety of transmitters, and the characteristics of each detected message are used to dynamically configure the demodulation process for each message. Channelization is selectively performed before, after, or before-and-after despreading, depending upon the particular environment and/or the particular characteristics of the received messages. Frequency synchronization to each transmitter is achieved by initializing a tracking loop within the demodulator associated with the transmitter, and code-phase synchronization to each transmitter is achieved by selectively inserting or deleting bits, based on the frequency and code-phase characteristics of the detected message.

25 Claims, 3 Drawing Sheets

SPREAD-SPECTRUM PHASE AND CHANNEL TRACKING

This application claims the benefit of U.S. Provisional Patent Application 60/859,834, filed 17 Nov. 2006.

BACKGROUND AND SUMMARY OF THE INVENTION

This invention relates to the field of communications, and in particular to a method and system that tracks phase diverse spread-spectrum signals without the use of phase-locked loops or late-early code-phase tracking.

U.S. Pat. No. 6,985,512, "ASYNCRONOUS SPREAD-SPECTRUM COMMUNICATIONS", issued 10 Jan. 2006 to Scott A. McDermott and Leif Eric Aamot, and incorporated by reference herein, teaches a communications system that includes a plurality of autonomous spread-spectrum transmitters, and a receiver that detects and demodulates the messages from these transmitters without establishing synchronization in phase or frequency with any of the transmitters. Each of the transmitters and the receiver use the same spreading code and the same nominal channel frequency, but each transmitted signal will have a particular code-phase and frequency relative to the receiver's code-phase and frequency. The baseband signal that contains the multiple transmissions is multiplied by each code-phase of the spreading code to identify active code-phases, i.e. code-phases at which a high correlation to the spreading code is found, and a Fast Fourier Transform (FFT) is applied to the signal at each active code phase to identify the magnitude and phase of the signal at the given active code-phase, from which the value of the information bit can be determined.

U.S. Pat. No. 7,227,884, "SPREAD-SPECTRUM RECEIVER WITH PROGRESSIVE FOURIER TRANSFORM", issued 5 Jun. 2007 to Scott A. McDermott, and incorporated by reference herein, provides an alternative scheme, wherein the baseband signal is partitioned into individual subsets of the channel, and the active code-phases within each subchannel are detected and demodulated. As illustrated in FIG. 1, with transmitters transmitting at code-phases and frequencies that are independent of the receiver's code-phase and frequency, an example baseband signal at the receiver includes messages 101-106 that occur at different code-phases p1-p6 and frequencies f1-f4. The frequency of the transmitters of messages 101 and 103 are both offset from a reference frequency at the receiver by the same amount f3 and will therefore appear in the same subchannel, but are received at different phases p1 and p3 relative to a reference code-phase at the receiver. Conversely, the messages 105 and 106 are both received at the same code-phase p6 relative to the reference code-phase, but the frequencies of the transmitters of these messages are offset by different amounts f4 and f1 relative to the reference frequency at the receiver, and will appear in different subchannels. By segregating and processing the baseband signal across both frequency and code-phase domains, each of these messages 101-106 can be distinguished from each other and subsequently decoded. U.S. Pat. No. 7,227,884 uses a progressive de-spread transform to efficiently identify active code-phases within the composite signal, and a progressive (or recursive) Discrete Fourier Transform (PDFT) to demodulate each de-spread message distinguished by frequency.

In a conventional spread-spectrum communication system, such as commonly used in cell phone systems, an individual receiver-despreader-demodulator system is allocated to each active transmitter. To compensate for frequency variations in the received signal, such as might be caused by Doppler effects, each receiver typically includes a phase-locked loop to synchronize the receiver to its assigned transmitter. To compensate for phase variations in the received signal, such as caused by differences between the spreading-code rates ('chip' rates) at the receiver and transmitter, each de-spreader typically includes a late-early feedback loop, wherein the receiver's chip rate is controlled based on a determined correlation at a later and an earlier code-phase. In this way, the signal that is provided to the demodulator is stable.

In U.S. Pat. No. 7,227,884, a common receiver is used to provide the baseband signal, each subchannel is preferably extracted by a common channelizer, and the de-spreading of each code phase preferably occurs sequentially using a progressive accumulation. In this manner, the cost of receiving and de-spreading a plurality of concurrently transmitted messages is substantially reduced compared to the more conventional spread-spectrum receivers. However, to achieve this cost reduction, conventional transmitter-specific frequency and code-phase synchronization cannot be used. Within a given channel, messages from multiple transmitters, each with its own variations with regard to the receiver, are processed by the same channelizer, and conventional phase-locked loops do not react well to discontinuities. In like manner, if the chip-clock in the de-spreader is advanced to track with one transmitter, it is likely to adversely affect the tracking with other transmitters.

As taught in U.S. Pat. No. 7,227,884, techniques are applied to assess adjacent subchannels and adjacent code-phases to determine if any of the messages in a given subchannel, code-phase bin has 'slipped' into a different sampling bin. If so, the messages that are decoded at this new subchannel, code-phase pair are routed to the same output queue as the prior messages. Although this process manages to substantially eliminate discontinuities in the output message queues, there is often a lack of coherency as the signal transitions from one bin to the other, reducing the demodulation efficiency and/or increasing the error rate.

It would be advantageous to compensate for the frequency and/or code-phase variation of received messages while still using common components for detecting messages from multiple transmitters. It would also be advantageous to minimize the transitions of messages from one component to another during the duration of the message.

These advantages, and others, are achieved by using common components to detect messages from a variety of transmitters, and using the characteristics of each detected message to dynamically configure the demodulation process for each message. Channelization is selectively performed before, after, or before-and-after de-spreading, depending upon the particular environment and/or the particular characteristics of the received messages. Frequency synchronization to each transmitter is achieved by initializing a tracking loop within the demodulator associated with the transmitter, and code-phase synchronization to each transmitter is achieved by selectively inserting or deleting bits, based on the frequency and code-phase characteristics of the detected message.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 2:
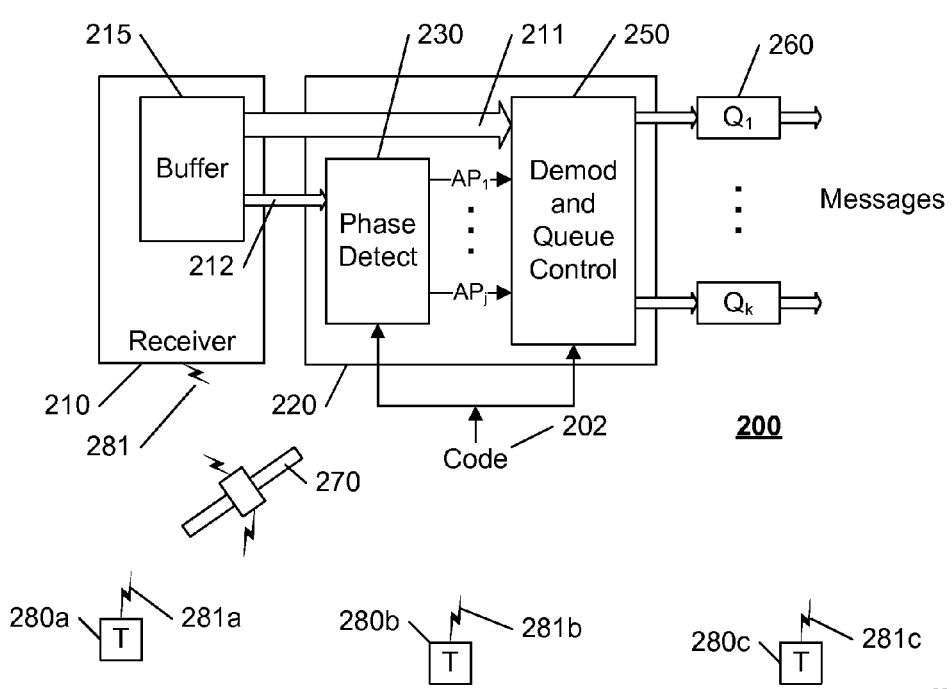
FIG. 2 illustrates an example block diagram of a spread-spectrum communication system.

FIG. 2 illustrates an example block diagram of a communications system 200 in accordance with this invention. The communications system 200 includes a plurality of transmitters 280a-280c, a receiver 210, and a message discriminator 220. The transmitters 280a-c each provide a transmit signal 281a-c comprising a message that is encoded using a spreading-code 202. To obtain a high degree of discrimination at different code-phases, and to optimize the decoding process, as detailed further below, a "maximal length sequence" or "M-Sequence" is preferably used as the spreading code. Maximal length sequences are simple to generate using maximal linear feedback shift registers.

Figure 1:
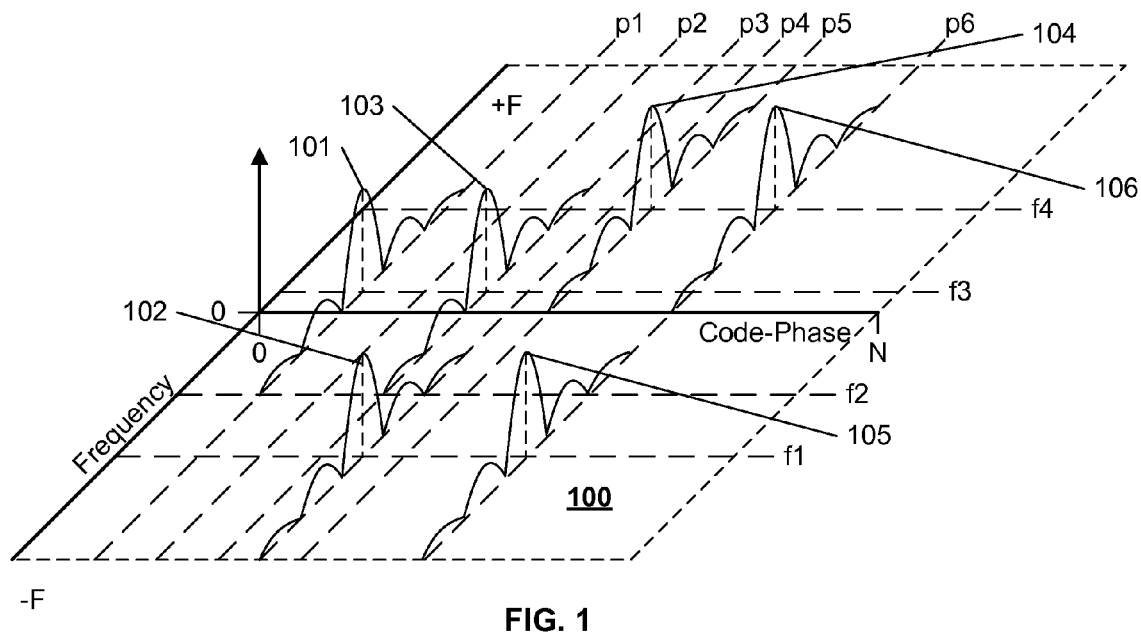
FIG. 1 illustrates an example baseband composite signal that includes signals at different frequencies and different code-phases.

Each transmitter 280a-c is substantially autonomous, and each transmitter 280a-c uses the same encoding and communications parameters, including the same spreading-code 202, and the same nominal frequency to provide the transmit signal 281a-c over the same communications channel. These transmit signals 281a-c form a composite signal 281 within this common communications channel. If two or more transmitters 280a-c transmit at the same time and at the same code-phase and essentially the same frequency, a collision results and these transmissions will not be distinguishable within the composite signal 281. If, on the other hand, a transmitter differs in either code-phase or frequency from each of the other transmitters, as discussed above with regard to FIG. 1, its transmitted signal will be distinguishable from the other transmitters' signals. The code-phase of a transmitter is defined relative to a reference at the receiver, and two transmitters will only have the same code-phase at the receiver if, for example, the start of each transmission from the transmitters arrive at the receiver at precisely the same time (within the duration of one or two code-phases ('chips') of the spreading code). Additionally, even if the transmissions from the two transmitters arrive with the same code-phase relative to the receiver, clock inaccuracies, component variations, Doppler effects, and the like, are likely to provide a frequency difference between the two transmitted signals that is sufficient to allow the two transmissions at the same code-phase to be distinguishable.

The likelihood of a simultaneous coincidence of both code-phase and transmit frequency among transmitters is also dependent upon the transmission 'density', that is, the number of messages transmitted within a given time interval, and the duration of theses transmitted messages. There are a number of applications that include the communication of relatively short and infrequently occurring messages. If each particular message is non-critical, the loss of individual messages due to an exact phase and frequency coincidence is acceptable. Alternatively, automatic retransmission request (ARQ) techniques, or other conventional collision-recovery techniques, can be used if the receipt of each message is required.

Applications that are particularly well suited for this invention include, for example, cargo or container tracking; intrusion or trespass detection; emergency beacons; pipeline monitors; utility consumption meters; and so on. An infrequently transmitting beacon on a cargo container, for example, will use very little power, and can be economically provided to allow tracking of even small containers. If some intermediate reports of the container's location are lost due to collisions with other transmissions, the effect will be non-consequential. In like manner, if pressure-sensing transmitters are dispersed over an open area, pedestrian or vehicular traffic across this area can be readily detected, even if some of the transmissions from the transmitters are lost. Large areas, such as airports, harbors, bridge and tunnel accessways, and so on, can be monitored for threats by distributing nuclear, chemical, or biological sensors throughout the area. In like manner, such sensors could be placed at intervals along all major roadways leading to a metropolitan area. If many such sensors are distributed, the alarms will be triggered sequentially, as the hazard material is moved from one sensor's coverage area to the next, and the likelihood of interference would be minimal. Similarly, an emergency beacon need only be detected once to have a desired rescue effect. These and other applications will be evident to one of ordinary skill in the art in view of this disclosure.

As disclosed in the above referenced U.S. Pat. No. 6,317,019, "IN-SITU REMOTE SENSING", and in U.S. Pat. No. 6,396,819, "LOW-COST SATELLITE COMMUNICATION SYSTEM", also referenced above, these applications are particularly well suited for satellite-relay configurations, wherein a satellite 270 receives the composite signal from all of the transmitters within view of the satellite 270 and relays the composite information to the receiver 210, in either a 'store-and-forward' mode, when the remote stations 280a-c and the receiver 210 are not contemporaneously in view of the satellite 270, or in a 'bent-pipe' mode, wherein the satellite 270 receives the information from the remote stations 280a-c and merely retransmits the information to the receiver 210, typically at a different transmission frequency. Because the satellite 270 and receiver 210 can be configured with directional antennas, a significant gain in signal to noise ratio can be achieved by such a configuration, without requiring a directional antenna at each remote station 280a-c. In the aforementioned area coverage embodiment, such as sensors throughout an airport or harbor, the receiving system would typically be located at the protected area, perhaps using multiple receivers/repeaters that forward their signals to a hub, or to individual receiver/detector sub-systems. For the purposes of this invention, the signal 281 that is received at the receiver 210 is considered to be the composite of the individual transmissions 281a-c, regardless of whether this composite 281 is relayed through one or more relays, such as a satellite 270, and regardless of whether it is received by a single receiver or multiple receivers.

The receiver 210 receives the composite signal 281 and continually stores samples of this composite signal in a receiver buffer 215. The message discriminator 220 accesses the signal in the buffer 215 for each of the tasks of signal detection and signal demodulation. In accordance with an aspect of this invention, the detection of received messages within the signal in the buffer 215, corresponding to transmissions 281a-c within the composite signal 281, is performed independent of the information content of the transmissions. That is, as contrast to conventional CDMA-DSSS, the phase detector 230 within the discriminator 220 is configured to detect the presence of each distinguishable received signal without searching for a particular known bit sequence in the transmissions 281a-c, as typically contained in each conventional DSSS message preamble.

Figure 3:
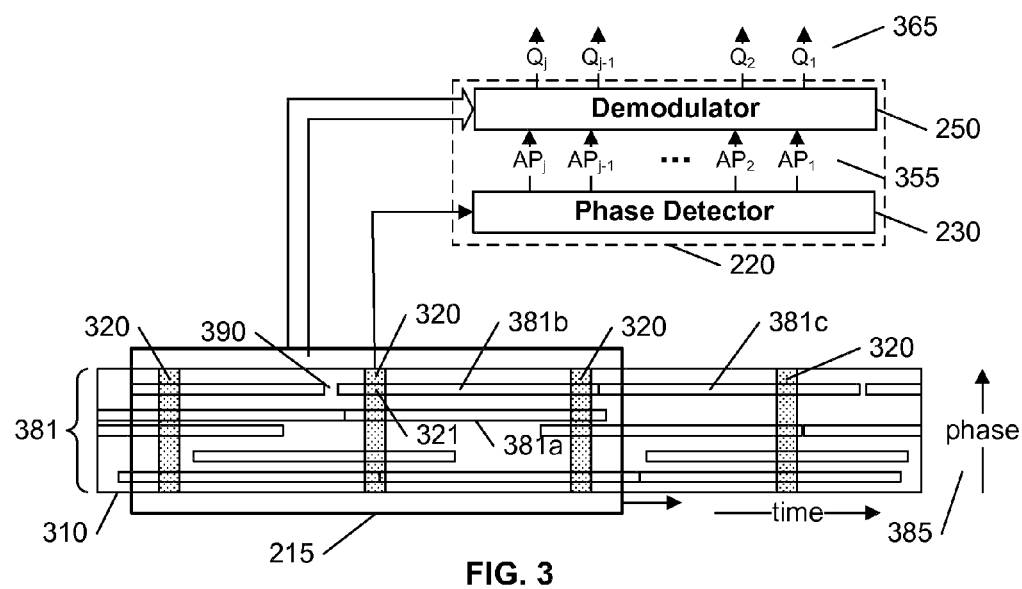
FIG. 3 illustrates an example message discriminator and demodulator.

As illustrated in FIG. 3, the buffer 215 contains a continually moving 'window' of the received signal over time. Depending upon the particular embodiment, the stored version 381 of the received signal 281 may be at RF, IF, or baseband frequency, with a corresponding pre-processor at subsequent stages to down-convert the RF or IF signals to a baseband signal. For ease of reference and understanding, it is assumed herein that the stored received signal 381 is a baseband signal, i.e. the common/nominal center frequency of the transmissions has been shifted to 0 Hz. The samples in receiver buffer 215 are preferably in In-phase/Quadrature pairs, providing no loss of data due to aliasing. In this manner, the appearance 381a-c of the transmitted messages 281a-c in the buffer 215 will therefore simply be the product of the spreading code and the information bits being transmitted from the transmitter.

The buffer 215 is typically structured as a circular buffer, and the 'movement' of the window formed by the buffer 215 is generally in increments of 'pages', or 'blocks' of received signal samples. That is, for example, as each page/block of the buffer 215 is filled with the newest samples of received signal 381, the page/block that contains the oldest received signal samples is reallocated to receive the subsequent samples of received signal 381. The minimum size of the receive buffer 215, to prevent the deletion of older signals before they have been fully processed, is discussed further below.

The phase detector 230 processes the signal 381 to identify any distinguishable messages 381a-c. As is known in the art, the presence of a transmission at a particular code-phase is detected by determining the amount of correlation between the received signal and a locally generated spread spectrum sequence at that code-phase. The individual components of a spread spectrum sequence are referred to as "chips", to avoid confusion with information-carrying bits. Correlation is based on the coincidence of sampled values of the received signal to the chip values of the locally generated spread spectrum sequence. At the transmitter, the spread spectrum signal is formed by multiplying the spreading code chips by the information/data bit that is to be transmitted, effectively inverting each code chip when the information bit is at one logic value, and not inverting the code bit when the information bit is at the other logic value. If the transitions of the information bits occur at known points within the spreading code, correlation can be determined within each interval between these points, using the magnitude of the determined correlation, independent of polarity (inverted or not inverted).

Because the phase detector 230 is able to detect correlated signals without reliance upon a known bit sequence within the transmitted message, the phase detector 230 is able to detect the messages 381a-c at any point during their duration. In a preferred embodiment, the phase detector 230 processes a segment/slice 320 of the signal 381 to detect each of the correlated signals, and communicates the detection of each 'active' code phase to the demodulator 250, each active code phase corresponding to a code phase at which a correlated signal (i.e. a segment 321 of a message 321a-c) was detected.

The demodulator 250 demodulates the message 381a-c found at each active code phase by tracking back in time through the buffer 215 for the start of the message, or for the last portion of the message that was processed based on the prior detection interval 320, then processing forward until the end of the message, or the end of the buffer 215. The interval between detection periods 320 and/or the minimum length of the messages 381a-c are configured to assure that at least one segment 321 of any message is included within a detection period 320. The size of the buffer 215 is configured to be able to assure that the signal 381 continues to be collected while the messages detected in the most recent detection period 320 are being demodulated, and that these detected messages are not overwritten by the newly arriving signals until each message is satisfactorily demodulated; typically, a duration that includes at least two detection periods 320 is sufficient to satisfy this constraint.

Figure 4A:
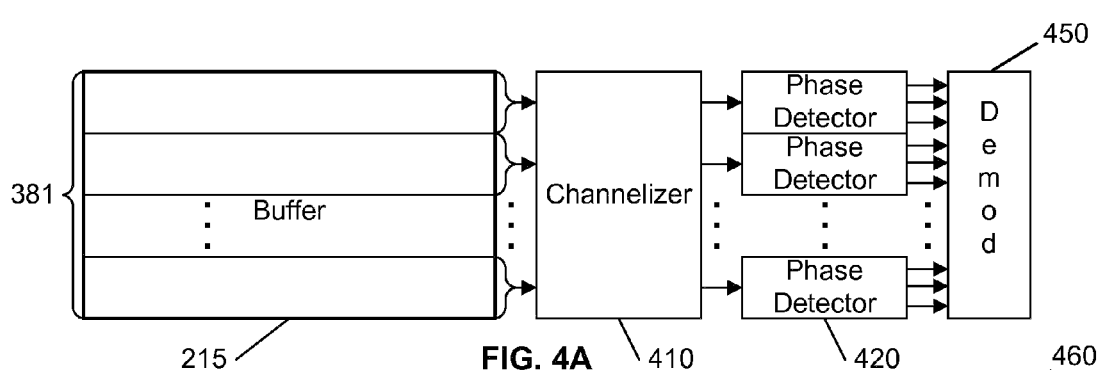
FIGS. 4A and 4B illustrate example arrangements of channelizers and phase-detectors.
Figure 4B:
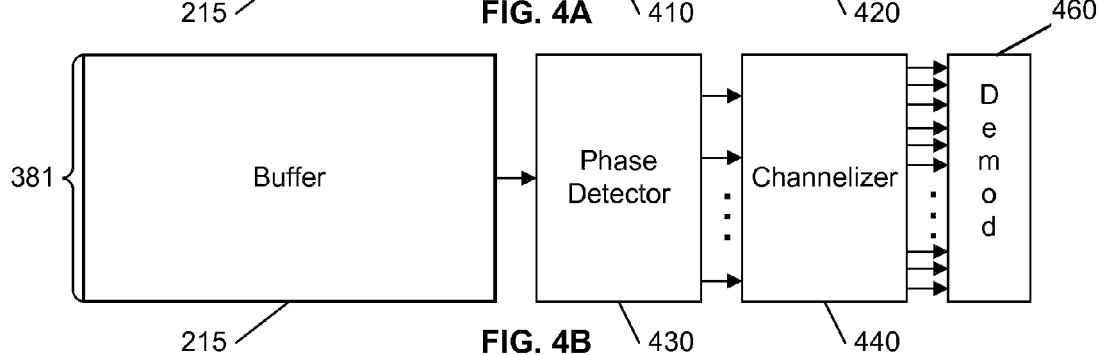

As discussed above with respect to FIG. 1, the transmitted signals are distinguishable in both code-phase and frequency. The phase detector 320 distinguishes phases at which transmissions are occurring, and, as illustrated in FIGS. 4A and 4B, a channelizer distinguishes frequencies at which transmissions are occurring. Channelization may occur before phase detection (FIG. 4A), after phase detection (FIG. 4B), or, as in a preferred embodiment of this invention, both before and after phase detection.

In FIG. 4A, the composite baseband signal 381 is partitioned into channels by the channelizer 410. As noted above, each transmitter 280a-c in FIG. 2 transmits at the same nominal frequency. However, due to component variations and other factors, the actual frequencies of the transmitters will generally be distributed about this nominal frequency, thereby allowing the aforementioned distinction of transmitters based on frequency. The channelizer 410 is configured to distinguish different bands of frequency about the receiver's actual frequency. For example, if the transmitted signal 281 is downshifted to baseband based on the receiver's frequency base, the signals 381a-c will occur at frequencies between +dmax and −dmax, where dmax is the maximum deviation of a transmitter's actual frequency from the receiver's actual downshifting frequency.

The channelizer 410 is configured to partition this spread of possible frequencies into "k" channels, and each channel is coupled to a corresponding phase detector 420 that identifies active phases within this channel. In this manner, transmitters that are transmitting at different frequencies are distinguished by channel at the channelizer 410, and within each channel, transmitters that are transmitting at different code-phases are distinguished at the phase detector 420. The output from the phase detector 420 is received at the demodulator 450. U.S. Pat. No. 7,227,884, referenced above, and copending U.S. patent application Ser. No. 11/622,274, "SPREAD-SPECTRUM RECEIVER WITH FAST M-SEQUENCE TRANSFORM", filed 3 Mar. 2007 for James F. Stafford, Scott A. McDermott, and William F. Seng, incorporated by reference herein, teach example uses of this technique.

In FIG. 4B, the entire baseband signal 381 is provided to a single phase detector 430, and a channelizer 440 channelizes the signals that occur at each active code-phase. U.S. Pat. No.

6,985,512, referenced above, teaches the use of a Fourier transform to distinguish the frequency component of a de-spread baseband signal. In this manner, transmitters that are transmitting at different code-phases are distinguished at 430, and at each code-phase, transmitters that are transmitting at different frequencies are distinguished at 440. The output from the channelizer 440 is received at the demodulator 460.

Figure 5:
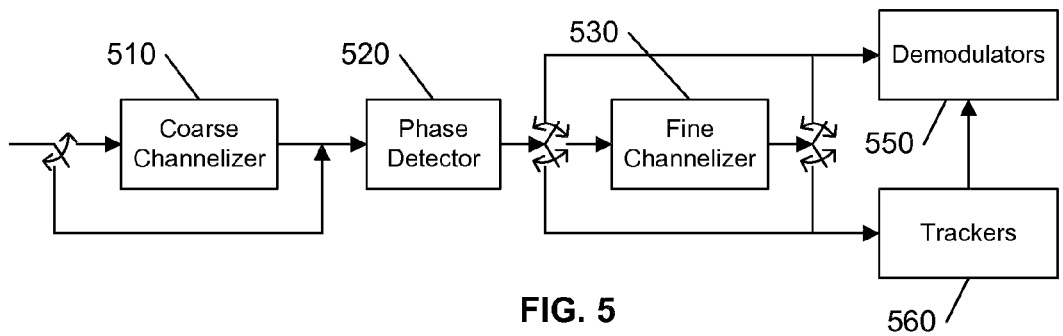
FIG. 5 illustrates an example block diagram of a message discriminator, demodulator, and tracker.

FIG. 5 illustrates an example block diagram of a message discriminator in accordance with this invention. In a preferred embodiment of this invention, the discriminator includes the ability to perform channelization before and/or after de-spreading, depending upon the particular environment and/or the particular application. The first channelization is termed coarse channelization, and the second channelization is termed fine channelization, consistent with their typical use when both are used.

When engaged, the coarse channelizer 510 receives the baseband signal and provides a plurality of channels to the phase detector(s) 520, similar to FIG. 4A, discussed above. Preferably, as discussed further below, the channelizer 510 partitions the baseband signal into channels having a width that facilitates the use of a phase-locked loop in the demodulator 550. Optionally, channelizer 510 can be bypassed, and the entire baseband signal is processed directly by the phase detector 520, similar to FIG. 4B.

The phase detector 520 is configured as either a single phase detector or multiple phase detectors, dependent upon whether the channelizer 510 is engaged to provide multiple channels, as discussed above with respect to FIGS. 4A and 4B.

When engaged, the fine channelizer 530 receives the correlations that are determined at each code-phase by the phase detector 520. If coarse channelizer 510 is engaged, the fine channelizer will receive the code-phase correlations found at each frequency. The fine channelizer 530 identifies frequency components in the sequence of correlations from the phase detector 520, typically via a Fourier transform, and preferably via a progressive Discrete Fourier transform (DFT), as disclosed in U.S. Pat. No. 7,227,884, referenced above.

The demodulator 550 receives the output from either the phase detector 520 or the fine channelizer 530, including the code-phase and frequency of detected/correlated signals. In accordance with an aspect of this invention, if the output is provided from the fine channelizer 530, the frequency information includes information that facilitates a finer frequency resolution at the demodulator 550. For example, using conventional Fourier transform techniques, the fine channelizer 530 can identify the bit-phase of each frequency-distinguishable message, from which the bit-phase of the message at any point before and after the detection period (320 in FIG. 3) can be determined, the term 'bit-phase' being used to identify the phase of the de-spread information signal. In this manner, the demodulator 550 can directly determine the bit-phase at the start of the message, thereby substantially reducing the time required to initialize the demodulation sequence.

In accordance with a further aspect of this invention, the output of either the phase detector 520 or the fine channelizer, or a combination of both, is provided to a tracker 560. The tracker 560 is configured to provide information to the demodulator 550 to improve the efficiency and/or effectiveness of the demodulation process.

In a conventional message discriminator such as disclosed in U.S. Pat. No. 6,985,512 and 7,227,884, substantially the same channelizing and de-spreading process that is used to detect each active message is used to provide de-spread signals during the demodulation process. However, recognizing that the demodulation of each message that is identified during the detection period (320 in FIG. 3) requires its own process for de-spreading the signal at the identified frequency of the transmitter for the duration of the message between detection periods, this invention provides for configurable channelized de-spreaders within each message demodulator. That is, although the channelizer(s) and phase detector(s) that are used for detecting active channels and phases cannot generally be configured to favor the detection of any particular message, the frequency and phase discriminators that are used to demodulate each detected message can, in fact, be optimized to detect each particular message. This optimization may be static, such as the aforementioned identification of a starting phase, or dynamic, such as the use of feedback loops within the demodulation process for each message to 'track' the particular frequency and/or code-phase changes that occur throughout the duration of the message. As used herein, the term 'tracking' includes compensating for variations in either code-phase or frequency variations, for example by transforming the input data or the receiver reference element to approximate a constant code-phase or constant-frequency signal relative to the receiver reference element.

In a preferred embodiment of this invention, a tracker 560 includes a plurality of phase-locked-loops to provide the tracking of frequency and/or code-phase variations during the demodulation of each detected message. As is known in the art, a phase-locked-loop requires a substantial number of samples to lock the loop to the measured phase of the input signal. In an embodiment of this invention, the tracker 560 receives frequency and phase information to facilitate the initialization of a phase-locked-loop corresponding to the beginning of the message, based on parameters determined while processing the samples during the detection period (320 in FIG. 3). That is, for example, the fine channelizer 530 may identify a pattern of variance between the transmit and receive frequency, such as caused by Doppler and other effects, during the detection period, and this information is used to initialize the corresponding phase-locked-loop as each message is identified for demodulation. After initialization, the phase-locked-loop will maintain frequency-lock with its corresponding received message in the receive buffer (381a-c in 215 of FIG. 3).

In a preferred embodiment of this invention, the tracker 560 is optionally configured to track code-phase drifts due to variations detected by the fine channelizer 530 during the detection period (320 in FIG. 3). That is, although the channelizer 530 is nominally configured to identify frequency variations within a channel, in this embodiment it is also configured to identify variations in the correlations associated with neighboring code-phases. Preferably, the channelizer 530 identifies variations in code phase through the duration of the detection period, and the pattern of these variations is used to predict and eliminate code-phase variations in the corresponding message, rather than dynamically reacting to detected code-phase 'slips', as in the aforementioned conventional systems. By predicting and tracking potential code-phase slips, the tracker 560 can be configured to adjust the relative code-phase difference between the transmitter and receiver by artificially adding or subtracting bits to the stream that is being processed by the phase detector associated with the particular message to maintain a constant code-phase. By maintaining a constant code-phase, rather than allowing the code-phase to drift to an adjacent code-phase, the initialization process that is generally required when a new code-phase is identified can be avoided.

Figure 6A:
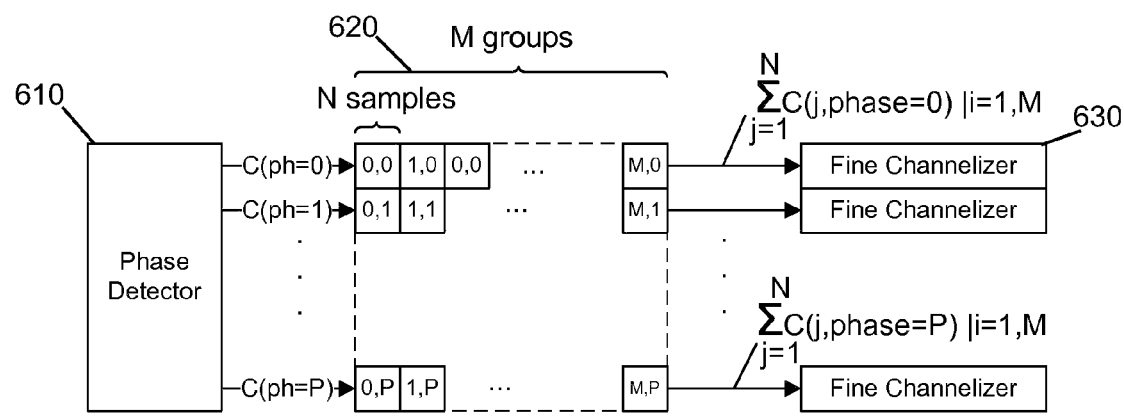
FIGS. 6A and 6B illustrate example flow diagrams for determining frequency and/or code-phase patterns during the message detection process.
Figure 6B:
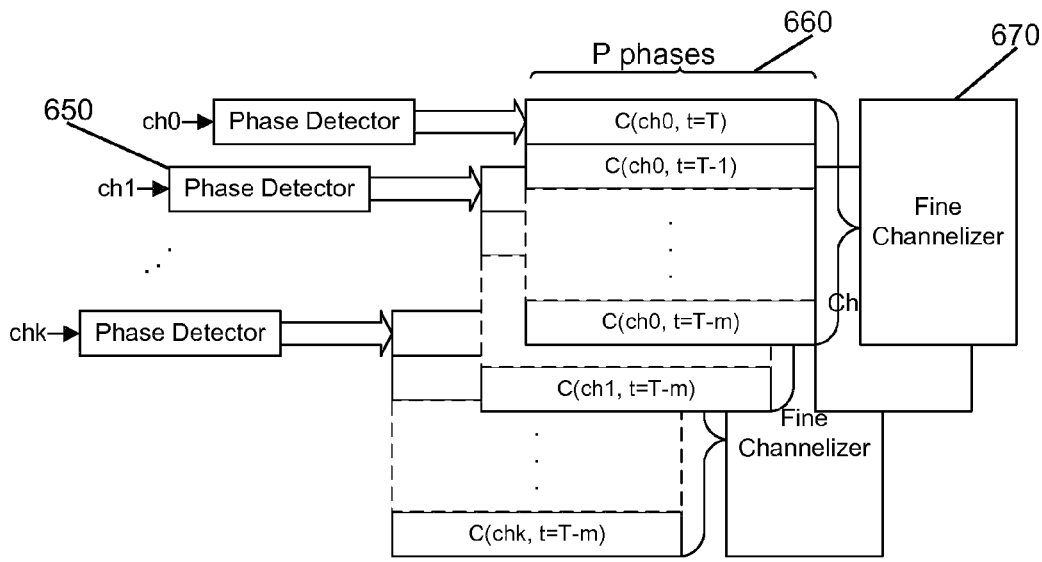

Any of a number of techniques can be provided to generate data to identify frequency and/or code-phase variations within the sample period to facilitate elimination of such variations during the processing of the corresponding message. FIGS. 6A and 6B illustrate two example techniques.

In FIG. 6A, a number (M*N) of correlation measures at each active code phase are collected over time, from a phase detector 610. The sequence of measures is partitioned into M groups 620 of correlation measures, each group including N correlation samples. For example, the detection period may include M information bits, and the N samples correspond to the correlations of each chip within the duration of each bit. Alternatively, each group may correspond to multiple information bits, or to a subset of an information bit, the N samples corresponding to a given number of chips deemed sufficient to provide a reliable measure of correlation. In an example embodiment, the sample period includes approximately twenty thousand chips, and a thousand (M) groups of twenty (N) chips are provided for determining patterns, using, for example discrete Fourier transforms and other pattern recognition techniques. The sum of each group of these twenty (N) samples is used as the correlation measure, and the thousand (M) sums are used to determine the pattern(s) found in these measures. However, because each of the M*N samples corresponds to a particular phase, the analysis of these samples cannot identify code-phase variations. That is, if a message's code-phase drifts to an adjacent phase, a pattern of drift will not be identifiable in any of the M samples for each phase. Optionally, the individual patterns can be analyzed to identify any cross correlations, corresponding, for example, to a decrease in correlation in one sequence and a corresponding increase in the correlation in another sequence at an adjacent phase. Analysis may be performed at the fine channelizer 630.

FIG. 6B illustrates an example technique that identifies code-phase variations within each channel. Each phase detector 650 at each channel is configured to provide a correlation measure at each phase, based on a sequence of chip correlations. In an example embodiment, the sequence of chips corresponds to an entire epoch of the spreading code, and a fast M-sequence transform is used to generate all of the correlation measures at each phase concurrently, as taught in copending U.S. patent application Ser. No. 11/622,274, identified and incorporated by reference above. At each correlation determination, the correlation measures are added to an array of correlation measures 660, replacing the oldest correlation measures in the array. Because the array includes the correlations as a function of time (vertical dimension of FIG. 6B) as well as code-phase (horizontal dimension), the fine channelizer 670 is able to identify patterns relative to both time (frequency) and code-phase.

As noted above, a progressive Discrete Fourier Transform is preferably used to identify patterns, such that as each new set of data is added, and each set of oldest data is removed, in either of the embodiments of FIG. 6A or 6B, the calculation of the resultant transform is only dependent upon the new and oldest set, rather than all of the intervening sets, thereby substantially reducing the time and resources required to determine such patterns.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

I claim:

1. A receiving system comprising:
a receiver that is configured to receive a composite signal that includes a plurality of received signals from a plurality of transmitters;
a receive buffer that is configured to store the composite signal received during at least a buffer time interval;
a phase detector that is configured to:
receive a segment of the composite signal received during a detection period within the buffer time interval, and
determine a plurality of characteristics of at least one received signal of the plurality of received signals based on a sequence of correlation measures within the detection period, the plurality of characteristics including an identified code-phase of a spreading code corresponding to the received signal and at least one parameter that facilitates predicting a variation of at least one characteristic of the received signal; and
at least one demodulator that is configured to demodulate the received signal within the receive buffer, based on the plurality of characteristics of the plurality of received signals.

2. The receiving system of claim 1, wherein the detection period is substantially shorter than the buffer time interval.

3. The receiving system of claim 1, wherein the plurality of characteristics of the received signal include at least one parameter that facilitates compensation for a frequency offset of the received signal relative to a nominal frequency.

4. The receiving system of claim 1, wherein the plurality of characteristics of the received signal include at least one parameter that facilitates compensation for variations in frequency of the received signal.

5. The receiving system of claim 1, wherein the plurality of characteristics of the received signal include at least one parameter that facilitates compensation for variations in code-phase of the received signal.

6. The receiving system of claim 1, including
a plurality of channelizers that are configured to partition the composite signal in the receive buffer into a plurality of subchannels,
wherein the plurality of characteristics of the received signal includes an identification of a subchannel within the plurality of subchannels at which the received signal is located.

7. The receiving system of claim 6, wherein
the plurality of channelizers are configured to provide samples from the corresponding subchannels to a plurality of phase detectors, including the phase detector that determines the characteristics of the received signal.

8. The receiving system of claim 7, including
a channelizer that is configured to receive the sequence of correlations from the phase detector to facilitate determination of at least a frequency characteristic of the received signal.

9. The receiving system of claim 1, including
a channelizer that is configured to receive the sequence of correlations from the phase detector to facilitate determination of at least a frequency characteristic of the received signal.

10. The receiving system of claim 9, wherein
the channelizer includes a discrete Fourier transform.

11. The receiving system of claim 9, wherein
the channelizer includes a progressive Fourier transform.

12. The receiving system of claim 1, wherein
the phase detector includes an M-Sequence transform.

13. The receiving system of claim 1, wherein
the phase detector includes a progressive de-spread transform.

14. The receiving system of claim 1, wherein
the sequence of correlations are each determined at the identified code-phase.

15. The receiving system of claim 1, wherein
the sequence of correlations includes correlations determined at a plurality of code-phases.

16. A method for detecting and demodulating a message from a composite signal, including:
storing, in a receiver buffer, the composite signal received during a first time interval,
determining, at a phase detector, a code-phase of the message based on a sequence of correlation measures within a detection period of the first time interval,
determining, at the phase detector, at least one parameter corresponding to a variation of at least one of the code-phase and a frequency of the message,
predicting, at the phase detector, an initial code-phase and initial frequency of the message at a time outside the detection period, based on the at least one parameter, and
demodulating, at a demodulator, the message within the first time interval, based on the initial code-phase and the initial frequency.

17. The method of claim 16, wherein the detection period is substantially shorter than the first time interval.

18. The method of claim 16, wherein the at least one parameter corresponds to a variation of the code-phase of the message.

19. The method of claim 18, wherein demodulating the message includes tracking the code-phase of the message based on the at least one parameter.

20. The method of claim 16, wherein the at least one parameter corresponds to a variation of the frequency of the message.

21. The method of claim 18, wherein demodulating the message includes tracking the frequency of the message based on the at least one parameter.

22. The method of claim 16, including
partitioning, at plurality of channelizers, the composite signal into a plurality of subchannels,
wherein determining the at least one parameter includes determining a variation of at least one of the code-phase and a frequency of the message within a subchannel at which the message is located.

23. The method of claim 22, including
identifying, at the phase detector, one or more other code-phases corresponding to one or more other messages within the subchannel at which the message is located.

24. The method of claim 16, wherein
demodulating the message includes tracking the code-phase and the frequency of the message based on the at least one parameter.

25. The method of claim 16, wherein
determining the at least one parameter includes evaluating a Fourier transform of the sequence of correlation measures.

\* \* \* \* \*